Patented Jan. 12, 1926.

1,569,396

UNITED STATES PATENT OFFICE.

JOHN A. RICE, OF BERKELEY, CALIFORNIA.

PROCESS OF PRODUCING ARTIFICIAL SNOW.

No Drawing.  Application filed December 31, 1923.  Serial No. 683,826.

*To all whom it may concern:*

Be it known that I, JOHN A. RICE, a citizen of the United States, and a resident of Berkeley, county of Alameda, State of California, have invented a new and useful Process of Producing Artificial Snow, of which the following is a specification.

The present invention relates to a process of producing artificial snow, and its particular object is to provide a simple, effective and economical way of producing the effect of snowing on stages or in the production of motion pictures, or on other occasions. It is proposed in the present invention to utilize for this purpose a specially prepared form of foam which is hardened to retain its form and which may be readily dispersed by directing an air blast against the same, whereby it is broken up into particles of substantially the size, weight and form of snowflakes so that a snow storm may be simulated which resembles in its artistic effects a real snow storm.

My foam may also be used to produce stage or picture effects of snow scenes and is particularly adapted for this purpose since it resembles snow not only in appearance but also in its other characteristics and may be gathered in large masses to simulate snow banks or snowdrifts, the consistency of the foam being such that it may be handled in the same manner as snow, may be shoveled to reproduce the scenic effect of snow shoveling and may be scattered on trees to make the same appear as being weighted down under the load of a heavy load of snow.

While my preferred form may be produced in many different ways, I have found by a large number of experiments that most excellent results may be obtained by the process hereinafter described.

In carrying out my process, I first mix one part of finely powdered rosin into fifteen parts of water and stir the mixture thoroughly. I then add sufficient aqua ammonia to completely saponify the rosin. It should be understood, however, that various other resins or resinous substances may be used with similar results.

I then place four parts of casein ground into powder in eight or nine parts of water and allow the casein to soak. I further dissolve one or more rennet tablets in water and stir it into the mixture. The rennet, which is well known in the chemical science as a curdling agent, changes the chemical nature of the casein so as to produce paracasein, which is insoluble in the presence of a calcium salt such as calcium chloride, as contra-distinguished from untreated casein which will dissolve in calcium hydroxide, for instance. The object for rendering the casein insoluble will appear later.

The mixture is allowed to stand for several hours until the casein is swelled thoroughly. While I have found casein particularly well adapted for this purpose, any other protein substance will produce similar results.

I then thoroughly mix and stir the two mixtures previously described, adding thereto preferably a certain proportion of albumen or blood serum, preferably in the proportion of four parts of the mixture described to one part of albumen or blood serum.

The compound thus obtained is then set aside for two or three days, during which time the rennet will complete its action. The whole mixture now obtained is of a creamy consistency. A small portion of a preservative, such as cresol, lysol, etcetera, may be added to prevent the mixture from spoiling.

To produce foam of the desired character, I take one part of the compound to one hundred parts of water and place this mixture in an agitating device working preferably on the principle of an egg beater, for the purpose of introducing air into the compound. I continue beating until a stiff froth is obtained, which ordinarily requires only a few minutes. I then add a small proportion, say one part to one hundred parts of the unbeaten compound, of a concentrated calcium chloride solution, $CaCl_2$, or any other soluble calcium salt. This strengthens the cellular structure of the foam and prevents the same from collapsing.

The foam thus obtained is allowed to be drained and to stand in a dry atmosphere a sufficient length of time for the remaining moisture to evaporate. The foam is now substantially of the characteristics of dry snow. It is of sufficient consistency to be cut with a knife, but has probably less body than snow, in so far as it will practically disappear without leaving any trace when compressed in the hand or rubbed between the hands. When taking a handful and blowing against it, it will readily separate into flakes which are sufficiently light to be blown over a considerable space by a mere puff.

To produce the effect of a snow storm on a stage or in the production of a motion picture, it is probably best to place a considerable amount of foam in a hopper and to apply an air blast, such as might be caused by an electrical fan, to the bottom of the hopper which will blow the foam over a large space and allow the same to come down gradually, substantially in the same manner as snowflakes.

I claim:

1. The method of producing artificial snow which consists in mixing a protein soaked in water in the presence of rennet with a foaming agent, in agitating the resulting product into a froth and adding a soluble calcium salt.

2. The method of producing artificial snow which consists in mixing a powdered protein soaked in water in the presence of rennet with a foaming agent, in agitating the resulting product into a froth and adding a soluble calcium salt.

3. The method of producing artificial snow which consists in mixing powdered casein soaked in water in the presence of rennet with a foaming agent, in agitating the resulting product into a froth and adding a soluble calcium salt.

4. The method of producing artificial snow which consists in subjecting a foam producing compound to the action of rennet, in agitating the resulting product into a froth and in adding a soluble calcium salt.

5. The method of producing artificial snow which consists in mixing a protein soaked in water in the presence of a curdling agent with a saponified resinous solution, in agitating the resulting product into a froth and adding a soluble calcium salt.

6. The method of producing artificial snow which consists in mixing a powdered protein soaked in water in the presence of a curdling agent with a saponified resinous solution, in agitating the resulting product into a froth and adding a soluble calcium salt.

7. The method of producing artificial snow which consists in mixing powdered casein soaked in water in the presence of rennet with a saponified resinous solution, in agitating the resulting product into a froth and adding a soluble calcium salt.

8. The method of producing artificial snow which consists in mixing ground casein soaked in water in the presence of rennet with a mixture of finely powdered rosin, water and aqua ammonia, adding albumen to the mixture and allowing to set, in then adding the resulting product to water and beating to a stiff froth and adding a quantity of calcium chloride.

9. The method of producing the effect of snowing which consists in passing an air blast through a previously prepared mass of hardened foam.

10. The method of producing the effect of snowing which consists in placing a previously prepared mass of hardened foam into a hopper and in passing an air blast through the hopper from below.

JOHN A. RICE.